Patented Nov. 5, 1940

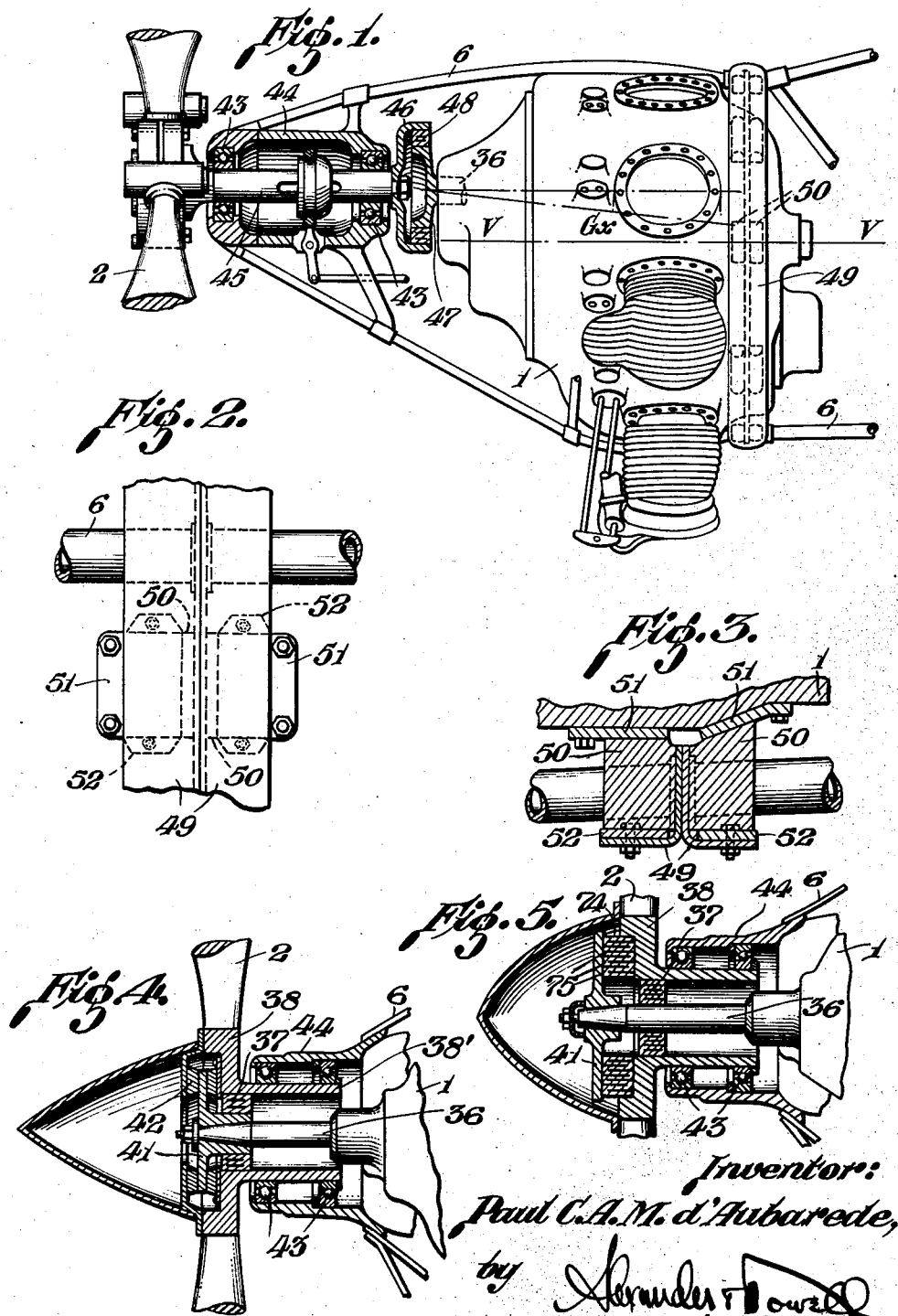

2,220,514

UNITED STATES PATENT OFFICE 2,220,514

ENGINE MOUNTING

Paul Charles Albert Marie d'Aubarede, Saint-Genis-Laval, France

Application June 1, 1937, Serial No. 145,904
In France June 9, 1936

12 Claims. (Cl. 244—54)

My invention relates to the elastic mounting of internal combustion engines or other reciprocating machines coupled with members having a high inertia and rotating at a relatively high speed, such as aircraft engines driving screw propellers.

When the known elastic mountings are applied to such engines, accidents such as breakages of shafts or of propeller blades are met with. These accidents result from the combination of the angular displacements of the engine axis permitted by the elastic mounting with the gyroscopic torque of the member with high inertia. There is in fact established between the oscillations of the engine under the action of the periodic forces or torques and the oscillations due to the gyroscopic reaction, complex phenomena of resonance or of surging which rapidly fatigue the parts.

On the other hand it is suitable that the engine and the propeller form a unit, at least as far as possible.

A first object of my invention is to provide a mounting wherein the propeller is rigidly supported by the frame, whilst the engine is elastically mounted thereon.

A further object of my invention is to provide a mounting of the character described, wherein the engine is orbitally attached to the frame by means of a flexible connection and is elastically supported and maintained thereon by elastic means.

Still a further object of my invention is a mounting in which the engine is orbitally attached to the frame by means of a flexible joint forming a connection between the engine shaft and the propeller shaft.

In the annexed drawing:

Fig. 1 is a side view with partial section showing an aircraft engine with propeller mounted in accordance with the present invention.

Fig. 2 is a detailed view drawn to an enlarged scale and showing an elastic supporting element.

Fig. 3 is a transverse section thereof.

Fig. 4 is a longitudinal section of a modified construction.

Fig. 5 illustrates a modification thereof.

In Fig. 1 a variable-pitch propeller 2 is rigidly carried by a shaft 45 supported by spaced ball bearings fixed to a supporting sleeve 44 bolted or otherwise secured to the frame 6 of the aircraft.

On the free end of shaft 45 there is keyed a cup-shaped member 46 enclosing with play a cap 47; and a rubber ring 48 adhering to members 46 and 47 connects the same together.

Cap 47 is in turn keyed on the shaft 36 of the aircraft engine 1. The latter is here of the radial cylinder type as shown.

The engine is elastically supported by a series of pairs of rubber blocks 50. Each block 50 adheres to two plates 51 and 52, Figs. 2 and 3, respectively secured to the engine and to flanged rings 49 fixed to the framework 6. Blocks 50 are preferably independent from rings 49 and do not come into contact with the same until they are loaded.

Ring 48 forms a transmission joint between the engine and the propeller. It also forms a flexible connection through which the engine is attached to the frame. The engine is thus free to oscillate orbitally about a center corresponding more or less to the center of ring 48, without affecting the propeller axis. Any gyroscopic reaction between engine and propeller is thus avoided and nevertheless the engine and its propeller form a very compact unit.

In the embodiment of Fig. 4, the propeller 2 is carried by a hub 38 formed with a hollow extension 38' which is supported by the spaced ball bearings 43 fixed to the supporting sleeve 44.

The engine shaft 36 extends through the bore of extension 38' and carries a disc 41. A rubber sleeve 37 is interposed between the hub of disc 41 and hub 38 or extension 38'.

The mounting of Fig. 5 is a modification of Fig. 4. Disc 41 is connected with hub 38 by only one row of rubber blocks 74. The latter are reinforced by cylindrical metallic rings 75 alternately contacting disc 41 or hub 38. Rings 75 ensure a better drive of the propeller. If the tractive effort of the propeller is liable to crush blocks 74 it may be of advantage to provide the same with reinforcing plates disposed transversely with respect to shaft 36.

All the elastic systems, i. e. the spring members supporting the engine and the couplings or joints between engine and propeller, are so devised as to operate as "arresting filters" for the vibrations deriving from the engine. It is well-known that this is obtained when the natural frequency of the system under consideration is lower than the lowest frequency of the vibrations divided by $\sqrt{2}$.

Moreover, it is of advantage to provide elastic means having an elastic reaction (i. e., a ratio of the variation in load to the variation in length or angle) which increases with the load, i. e., with the average driving torque of the engine. Thus at low speeds when the torque is reduced the elastic reaction is small; the natural frequency is low and may easily fulfill the arresting filter condition. When the speed increases, the torque is high and the elastic reaction increases causing an increase of the natural frequency of the system. But the frequency of the vibrations is then high and the arresting filter condition is also fulfilled.

This increase in elastic reaction is easily obtainable with rubber which operates as a spring without any noticeable change in volume, through a sort of elastic flow. By providing suitable cups, casings, etc., this flow is more or less hindered and the elastic reaction is thereby increased.

I claim:

1. In combination a frame; an engine subjected to periodic forces and to periodic torques tending to oscillate the engine about varying natural oscillation axes; means for elastically supporting said engine on said frame; a driving shaft rigidly carried by said engine; a rotating member having a high moment of inertia, said member being rigidly and rotatably supported by said frame and driven by the driving shaft; and a universal transmission joint connecting said driving shaft and said rotating member, said joint forming a flexible connection to orbitally support said engine.

2. In a combination as set forth in claim 1, said transmission joint embodying a member made of an elastic material so as to form at the same time an elastic coupling.

3. In a combination as set forth in claim 1, said transmission joint comprising a cup-shaped member; a cap housed with play within said cup-shaped member; and a ring of elastic material interposed between said member and said cap and adhering to both.

4. In a combination as set forth in claim 1, said rotating member having a hub receiving and spaced from the shaft; and said transmission joint including an elastic sleeve connecting the shaft and member within the hub.

5. In a combination as set forth in claim 1, said rotating member having a hub receiving and spaced from the shaft; and said shaft having a disc fixedly mounted thereon exterior to said hub and adjacent said member; and said transmission joint including an elastic sleeve connecting the shaft and member within the hub, and elastic blocks connecting the disc and member.

6. In a combination as set forth in claim 1, said rotating member having a hub receiving and spaced from the shaft, and having an annular recess; said shaft having a disc fixedly mounted thereon within the annular recess and spaced from the walls thereof; and said transmission joint including an elastic sleeve connecting the shaft and member within the hub, and elastic blocks connecting the faces of the disc with the walls of the recess.

7. In a combination as set forth in claim 1, said elastic engine-supporting means comprising a series of pairs of blocks of elastic material adhering to plates respectively fixed to the engine and to the frame.

8. In combination a frame; an engine subjected to periodic forces and to periodic torques tending to oscillate the engine about varying natural oscillation axes; means to support elastically said engine on said frame; a hollow shaft rigidly and rotatably supported by said frame; a rotating member having a high moment of inertia carried by said hollow shaft; a driving shaft rigidly carried by said engine, said driving shaft extending through said hollow shaft; and a transmission joint between said driving shaft and said hollow shaft, said joint forming a flexible connection to orbitally support said engine.

9. In a combination as set forth in claim 8, said driving shaft carrying a disc beyond the end of said hollow shaft; an annular mass of elastic material between said driving shaft and the bore of said hollow shaft; a flanged hub at the end of said hollow shaft; and blocks of elastic material interposed between said disc and said flanged hub and adhering to both.

10. In a combination as set forth in claim 8, said driving shaft carrying a disc beyond the end of said hollow shaft; an annular mass of elastic material between said driving shaft and the bore of said hollow shaft; a flanged hub at the end of said hollow shaft; a plate fixed to said flanged hub and located beyond said disc with respect to said flanged hub; blocks of elastic material inserted between said disc and said flanged hub and adhering to both; and blocks of elastic material inserted between said disc and said plate and adhering to both.

11. In combination a frame; an engine subjected to periodic forces and to periodic torques tending to oscillate the engine about varying natural oscillation axes; a driving shaft rigidly carried by said engine; a rotating member having a high moment of inertia rigidly and rotatably supported by said frame and driven by said shaft; elastic means interposed between said member and said shaft to permit said engine to oscillate without substantially affecting the axis of said rotating member; said elastic means forming one of the supporting means for said engine; and a system further elastically supporting the engine on the frame.

12. In a combination as set forth in claim 11, said system comprising flanged rings mounted on the frame at a point remote from the rotating member and surrounding the engine; and series of pairs of elastic blocks interposed between the rings and engine; the blocks of each pair engaging opposite faces of the flanges.

PAUL CHARLES ALBERT

MARIE D'AUBAREDE.